United States Patent
Schwall et al.

(10) Patent No.: US 10,336,646 B2
(45) Date of Patent: Jul. 2, 2019

(54) CHEMICALLY RESISTANT GLASS

(71) Applicant: SCHOTT AG, Mainz (DE)

(72) Inventors: Michael Schwall, Mainz (DE); Edgar Pawlowski, Stadecken-Elsheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/273,857

(22) Filed: Sep. 23, 2016

(65) Prior Publication Data

US 2017/0081239 A1 Mar. 23, 2017

(30) Foreign Application Priority Data

Sep. 23, 2015 (DE) .................. 10 2015 116 097
Aug. 29, 2016 (EP) .................... 16186177

(51) Int. Cl.
| | | |
|---|---|---|
| *C03C 4/20* | (2006.01) | |
| *C03C 21/00* | (2006.01) | |
| *C03C 3/087* | (2006.01) | |
| *C03C 4/18* | (2006.01) | |
| *A61J 1/14* | (2006.01) | |
| *C03C 3/112* | (2006.01) | |

(52) U.S. Cl.
CPC .............. *C03C 3/087* (2013.01); *A61J 1/1468* (2015.05); *C03C 3/112* (2013.01); *C03C 4/18* (2013.01); *C03C 4/20* (2013.01); *C03C 21/002* (2013.01); *C03C 2204/00* (2013.01)

(58) Field of Classification Search
CPC .. C03C 3/00; C03C 3/087; C03C 4/18; C03C 3/076; C03C 3/04; C03C 3/083; C03C 4/20
USPC ............................................. 501/55
See application file for complete search history.

(56) References Cited

U.S. PATENT DOCUMENTS

| | | | |
|---|---|---|---|
| 8,753,994 B2 | 6/2014 | Danielson et al. | |
| 2011/0098172 A1 | 4/2011 | Brix | |
| 2012/0297829 A1* | 11/2012 | Endo | ............ C03C 3/085 |
| | | | 65/30.14 |
| 2013/0101764 A1* | 4/2013 | Schaut | ............ C03C 3/087 |
| | | | 428/34.4 |
| 2013/0186140 A1 | 7/2013 | Brix | |
| 2013/0233386 A1 | 9/2013 | Hanawa | |

FOREIGN PATENT DOCUMENTS

| | | |
|---|---|---|
| DE | 102009051852 | 3/2013 |
| DE | 202012013126 | 11/2014 |
| DE | 102013114225 | 6/2015 |
| EP | 0987731 | 3/2000 |
| EP | 2539289 | 5/2015 |
| EP | 2876092 | 5/2015 |
| RO | 83460 A | 3/1984 |
| WO | 2013063002 | 5/2013 |
| WO | 2014196655 | 12/2014 |

* cited by examiner

*Primary Examiner* — Lee E Sanderson
*Assistant Examiner* — Michael C Romanowski
(74) *Attorney, Agent, or Firm* — Ohlandt, Greeley, Ruggiero & Perle, L.L.P.

(57) ABSTRACT

A glass is disclosed that is particularly suitable as pharmaceutical packing medium and as a chemically pre-stressable glass comprising at least the following components (in mol-% on oxide basis): 64-77 $SiO_2$, 5-14 $Al_2O_3$, 4-12 $Na_2O$, 1-12 CaO, 0-14 MgO, 0 -2 $ZrO_2$, 0-4.5 $TiO_2$, wherein the ratio $Al_2O_3/Na_2O \geq 1$, wherein the ratio $Al_2O_3/CaO \geq 1.5$, and wherein the total content $SiO_2+Al_2O_3<82$ mol-%. Preferably, a working temperature T4 of less than 1350° C. and a hydrolytic resistance according to DIN ISO 719 HGB1 and according to ISO 720 HGA are obtained.

19 Claims, No Drawings

CHEMICALLY RESISTANT GLASS

CROSS REFERENCES TO RELATED APPLICATIONS

This application claims priority from German patent application 10 2015 116 097.8, filed on Sep. 23, 2015 and from European patent application 16 186 177.8, filed on Aug. 29, 2016. The entire contents of these priority applications are incorporated herein by reference.

BACKGROUND OF THE INVENTION

The invention relates to a glass that is particularly suitable for use as a primary packaging material in the pharmaceutical industry. Such glasses are subject of high demands with respect to the chemical resistance. In addition the glasses shall be delamination-free, i.e. in use there shall not delaminate any layers from the glass that would contaminate the packaged pharmaceutical agent.

Apart from the very good chemical resistance those glasses that are suitable as primary packaging material in the pharmaceutical industry are subject of further demands, however.

Thus, the glass must be producible in common melting devices, i.e. the viscosity of the melt must be not too high—if possible, the working temperature (temperature at which the viscosity is $10^4$ dPas, also designated as VA or T4) shall not exceed the maximum value of 1350° C. T4 for an energy saving production should be as low as possible.

In addition, the glasses should preferably be free of boron oxide. The EU (European Union) recently has regarded boric acid, diborontrioxide, disodiumtetraborate anhydride, disodiumtetraborate-decahydrate and disodiumtetraborate-pentahydrate as toxic during production. This leads to the consequence that during manufacture particular boundary conditions must be fulfilled and respectively particular precautionary measures must be taken when using such raw materials.

Due to the relatively high costs of boron-containing raw materials, the foreseeable shortages in suitable qualities, as well as the current discussion with respect to reassessments of the toxicity of boron compounds, boron-free glasses are of interest.

Finally the glass should preferably be chemically pre-stressable. In the chemical pre-stressing a particular part of the sodium ions are replaced by potassium ions which, due to the larger potassium ions, lead to a compression stress within the glass. To allow for an effective chemical pre-stressing several boundary conditions must be fulfilled.

From U.S. Pat. No. 8,753,994 B2 and from DE 20 2012 013 126 U1 aluminum silicate glasses are known that shall have an improved chemical resistance. The $SiO_2$ content is between 70 and 78 mol-%, the $Al_2O_3$ content is between 4 and 9 mol-%, the MgO content is between 0 and 7 mol-%, and the CaO content is between 0 and 6 mol-%. However, in practice the hydrolytical resistance of these glasses is not sufficient.

The RO 83460 A discloses an aluminum silicate glass having a $SiO_2$ content of 70 to 73 wt.-%, an $Al_2O_3$ content of 3 to 6 wt.-%, a CaO content of 3 to 9 wt.-%, with partial additions of BaO up to 2 wt.-%, and a $Na_2O$ content of 11 to 14 wt.-%, partially with small additions of $K_2O$.

The chemical resistance of this glass is not sufficient.

From EP 2 876 092 A1 a pharmaceutical glass with 50 to 80 mol-% of $SiO_2$, 5-30 mol-% $Al_2O_3$, 0-2 mol-% $Li_2O$ and 5-25 mol-% $Na_2O$ is known. However in this document there are no statements with respect to chemical resistance. However, it must be assumed that it is relatively bad.

From WO 2014/196655 A1 a further pharmaceutical glass is known comprising 69 to 81 mol-% of $SiO_2$, 4 to 12 mol-% $Al_2O_3$, 0 to 5 mol-% $B_2O_3$, a total alkali content of 5 to 20 mol-%, 0.1 to 12 mol-% $Li_2O$, and a total content of MgO+CaO+SrO+BaO from 0 to 10 mol-%.

Although these glasses have a very low working temperature they must be seen as not sufficiently chemically resistant.

From DE 10 2013 114 225 A1 a chemically pre-stressable glass is known comprising 56-70 mol-% of $SiO_2$, 10.5 to 16 mol-% of $Al_2O_3$, 10-15 mol-% of $Na_2O$, and optional additions of $B_2O_3$, $P_2O_5$, $K_2O$, MgO, ZnO, $TiO_2$, $SnO_2$, as well as 0.001-5 mol-% F. Due to its chemical composition this glass presumably does not have a sufficient chemical resistance.

From DE 10 2009 051 852 B4 finally a boron-oxide-free neutral glass is known comprising 65-72 wt.-% of $SiO_2$, 11-17 wt.-% of $Al_2O_3$, 2-8 wt.-% of $Na_2O$, 3-8 wt.-% of MgO 4-12 wt.-% of CaO and 0-10 wt.-% ZnO, wherein the weight ratio CaO/MgO is between 1.4 and 1.8, and a good chemical resistance prevails.

However these glasses are not optimized with respect to a good chemical pre-stressing. In addition, the working temperature is too high. Also the crystallization behavior is problematic due to the low content of network modifiers.

SUMMARY OF THE INVENTION

It is a first object of the invention to disclose a boron-oxide-free glass having a sufficient chemical resistance, so as to be suitable as a primary packaging material in the pharmaceutical industry.

It is a second object of the invention to disclose a boron-oxide-free glass that can be produced in common melting installations at not too high melting temperatures.

It is a third object of the invention to disclose a boron-oxide-free glass that is well suited for chemical pre-stressing.

It is a forth object of the invention to disclose a boron-oxide-free glass that is suited for application as thin or ultrathin flat glass, as apparatus glass for laboratory applications and for chemical installation constructions, assubstrate, superstrate or covering, in particular for electrotechnical applications, such as for TFT-, PWP-, OLED-screens, as well as for the photovoltaic, as tube glass, in particular for lamps, halogen lamps or fluorescent lamps or for solar thermal applications, as reflector glass, in particular for lamps, as architectural glass, as temperature-cycling resistant glass, in particular for stove parts, refrigerator parts or hearth parts.

These and other objects are solved by a glass comprising at least the following components (in mol-% on oxide basis):

| | |
|---|---|
| $SiO_2$ | 64-77 |
| $Al_2O_3$ | 5-14 |
| $Na_2O$ | 4-12 |
| CaO | 1-12 |
| MgO | 0-14 |
| $ZrO_2$ | 0-2 |
| $TiO_2$ | 0-4.5 | wherein the ratio $Al_2O_3/Na_2O \geq 1$;
wherein the ratio $Al_2O_3/CaO \geq 1.5$;
wherein the total content $SiO_2+Al_2O_3<82$ mol-%.

The object of the invention is fully solved in this way.

As far as in this application compositions are given in the form that particular components are contained therein or that they comprise particular components, then these compositions are always to be understood that any further components may be contained therein (open composition).

However, in a further configuration of the invention the given compositions are also to be understood so that the respective given components are contained therein (closed composition), however with the proviso that unavoidable contaminations that are due to the nature of the glass manufacture, may further be contained therein. Depending on the purity of the used raw materials, such unavoidable contaminations are limited to a maximum of 1 mol-%, preferably of 0.5 mol-%, more preferred of 0.1 mol-%, or even of 0.05 mol-%.

As far as within this application compositions are given in the form that they can consist of particular components, these compositions are always to be understood that only the given components are contained therein (closed composition), however with the proviso that unavoidable contaminations that are due to the nature of the glass manufacture, may be contained therein. Depending on the purity of the used raw materials, such unavoidable contaminations are limited to a maximum of 1 mol-%, preferably of 0.5 mol-%, more preferred of 0.1 mol-%, or even of 0.05 mol-%.

As far as within this application compositions are given in examples by listing particular components, these statements are to be understood as closed compositions, however with the proviso that unavoidable contaminations that are due to the nature of glass manufacture, may be contained therein. Depending on the purity of the used raw materials such unavoidable contaminations are limited to a maximum of 1 mol-%, preferably of 0.5 mol-%, further preferred of 0.1 mol-%, or even of 0.05 mol-%.

Apart from unavoidable imp the glass is preferably free of boron oxide.

A minimum $SiO_2$ content of 64 mol-% is necessary for a good chemical resistance. With a $SiO_2$ content of more than 77 mol-% the working temperature increases too much so that a processing in standardized melting equipment is no longer possible.

The minimum content of $Al_2O_3$ is 5 mol-%, preferably at least 9 mol-%, more preferred at least 10.3 mol-%. The minimum content is selected so that the glass structure is assisted, i.e. a better network forming and an excellent hydrolytical resistance is reached. In addition, additions of $Al_2O_3$ improve in particular the chemical resistance within a pH-value of 6-14. In particular the weakness of the chemical resistance of purely silicious glasses in the pH-region of 8-14 is strongly improved. The maximum content of $Al_2O_3$ is 14 mol-%, preferably 12.5 mol-%. The maximum total content of $SiO_2+Al_2O_3$, as well as preferably also $ZrO_2$ should be <82 mol-%, to avoid an increase of the working temperature beyond 1350° C., and thereby to avoid an increase in the crystallization tendency and in production cost.

Since the glass according to the invention apart from unavoidable contamination free of boron oxide, the danger of delaminations is avoided.

To obtain a good chemical pre-stressing behavior (ion-exchange below the transition temperature) it is advantageous, if after the ion-exchange (potassium ions against sodium ions) the reached mixed alkali ratio, of the two alkali oxides is in a balanced ratio to each other. Preferably, the molar ratio of $Na_2O$ to $K_2O$ should be in a fixed range between 3:1 to 5:1.

This assists an increase of the hydrolytic resistance of the glass up to at least HGB1 (according to ISO 719). In addition, a chemically pre-stressed glass has the advantage of an increased fracture and scratch resistance. The glass can be used for pharmaceutical containers without, but also with ion exchange.

By adjusting the ratios $Al_2O_3/Na_2 \geq 1$ and $Al_2O_3/CaO \geq 1.5$ a good chemical resistance is supported in particular with respect to the resistance within the autoclave test according to ISO 720. The chemical pre-stressing ability is assisted by the sodium content in the given range of 4 to 12 mol-%, preferably in combination with a freeness from lithium oxide. In particular, the ratio $Al_2O_3/Na_2O$ is selected so that the hydrolytic resistance according to ISO720 is better than 62 µg/g, which is assisted by the formation of the $[AlO^{4-}]$—$Na^+$-structure element.

In addition, the ratio $Al_2O_3/CaO$ is selected so that respectively almost two $[AlO^{4-}]$-groups are present for each $Ca^{2+}$-ion, whereby the mobility of the $Ca^{2+}$-species is lowered and an excellent hydrolytic resistance is made possible.

With the glasses according to the Invention after a chemical pre-stressing a minimum compressive stress (CS) of at least 500 MPa is reached. Even values of at least 700 MPa, at least 800 MPa or at least 900 MPa can be reached.

The $Na_2O$ content is at least 4 mol-%, to ensure a low viscosity during melting and to ensure on the other hand, during the preparation of pharmaceutical glasses and the common subsequent processing steps (washing processes, chemical pre-stressing), a low leaching resistance. A content of 12 mol-% $Na_2O$ should not be exceeded, since otherwise the hydrolytic resistance decreases.

The $K_2O$ content is 0 to 3 mol-%, preferably more than 0.5 mol-%, more preferred more than 0.8 mol-% is contained. Particularly preferred the content of $K_2O>0.5$ mol-% up to <2.5 mol-%. Small additions of $K_2O$ decrease the crystallization tendency which is particularly advantageous in tube drawing.

The glasses according to the invention may in addition comprise 0 to 4.5 mol-% of $TiO_2$, preferably at least 0.1 mol-%, more preferred at least 0.5 mol-% of $TiO_2$. Further preferred the $TiO_2$ content is 0.1 mol-% up to 2.0 mol-%, particularly preferred 0.5 to 1.5 mol-%.

Small additions of titanium oxide $TiO_2$ can improve the hydrolytic resistance of the glasses and can assist to reach a viscosity suitable for processing. Depending on the application, titanium oxide is not added at all.

The glasses according to the invention may in addition comprise 0.0 to 2 mol-% of zirconium oxide.

An addition of zirconium oxide improves the hydrolytic resistance of the glasses. Thereby the resistance at slightly increased pH-values (8-9) is stabilized without an increase of the working temperature beyond 1350° C.

$ZrO_2$ can be totally or partially replaced by $TiO_2$. By the addition of $TiO_2$ the glass structure can be stabilized in that structural units of $[TiO_3]^{2-}$ and $Ca^{2+}$ form which decrease the mobility of the $Ca^{2+}$-ions and thereby also the leachability. A limit of 4.5 mol-% should not be exceeded to avoid that the working temperature increases beyond 1350° C. and to avoid that the devitrification tendency is increased.

A particularly good chemical pre-stressing ability is reached when the total content $ZrO_2+TiO_2$ is at least 0.1, preferably at least 0.5 mol-%, particularly preferred at least 1 mol-%.

The total content $ZrO_2+TiO_2$ should however not exceed 4.5 mol-%, since otherwise the crystallization tendency and the working temperature increase too much.

The glasses according to the invention preferably are free of zinc oxide, apart from unavoidable contaminations, since this is undesired for pharmaceutical applications.

In addition, SrO can be introduced up to 3.5 mol-% into the glass to keep the working temperature as low as possible by disorder. Preferably, at least 0.1 mol-%, more preferably at least 0.5 mol-% of SrO is added. A small addition of SrO decreases the leachability by lowering the mobility.

An addition of lead oxide PbO preferably is avoided, due to toxicologic reasons.

Even if on a laboratory scale bubble-free and streak-free glasses can be obtained without the addition of refining agents, for mass production the glasses according to the invention may contain 0.01 to 2 mol-%, preferably 0.1 to 1.5 mol-% of refining agents.

By adding fluorine the viscosity of the melt is decreased which accelerates the refining. Due to environmental protection reasons the addition of $As_2O_3$ or $Sb_2O_3$ should be completely dispensed with if possible.

By adding chlorides or fluorides as refining agents the acid resistance of the glass tends to be decreased. Also an addition of chlorides may lead to the consequence that during each heating chloride evaporates and subsequently condensates on the glass products. Although an addition of fluorides leads to a decrease in the working temperature T4, however thereby the chemical resistance is slightly decreased. Also by the addition of chloride evaporation and respectively condensation effects may result. Finally the melting pot resistance may be impaired by additions of fluoride.

Due to this reason the addition of chloride and fluoride as a refining agent is limited to a maximum of 1.5 mol-% of chloride and fluoride, respectively.

The glasses according to the invention are in particular suited as primary packaging material in the pharmaceutical industry, in particular as bottle, syringe, carpoule or ampoule. Herein the glass may optionally be chemically pre-stressed.

In addition, the glasses according to the invention are suitable as thin glass or ultrathin glass. Glasses according to the invention are also used as sheets or so-called wafers as thin or ultrathin components for sophisticated applications in optics, optoelectronics and electronics. For instance, display glasses and touchscreen glasses cam glasses, glasses for the semiconductor industry or for energy storage, such as in thin-film-batteries, should be mentioned. Also biotech-applications use flat glasses according to the invention.

For all applications glasses within the frame of processing and application, respectively are exposed to liquid media such, as water, acids or basic solutions. Consequently these glasses must be chemically inert.

In particular, this holds true also with respect to glasses which are subject to a chemical pre-stressing.

Thin and ultrathin glass, respectively, can be manufactured with a controlled thickness between between 10 and 500 micrometers.

Thin and ultrathin glass, respectively, can be produced by the down-drawing-processes, by overflow-fusion-processes, by special floating processes or by redrawing processes, by polishing down from thicker glass or slimming thicker glass by etching.

The starting glass may be provided in the form of sheets or rolls. Preferably, the starting glass has a smooth, pristine surface with a surface roughness Ra of less than 5 nanometers. The direct hot forming such as by means of down-drawing or overflow-fusion are the preferred processes for mass production. Thereby fire-polished surfaces having a surface roughness Ra of less than 5 nanometers, preferably of less than 2 nanometers, up to less then 1 nanometer can be produced.

Ultrathin glass is ideal for application in roll-to-roll processing. The low thickness allows for the glass flexibility.

Ultrathin glass may also be produced by floating processes with a highly smooth surface at low cost. However in the floating process, due to the floating on the tin side, two slightly different surfaces are produced. The slight differences between the two sides during later chemical pre-stressing may lead to warping issues and may impair printing and coating, since the two sides have different surface energies.

Apart from that here is a range of further advantageous applications. These include applications as:
apparatus glass for laboratory applications and for chemical installation constructions;
substrate superstrate or coverings, in particular for electrotechnical applications, such as for TFT-, PWP-, OLED-screens, as well as for the photovoltaic;
tube glasses, in particular for lamps, halogen lamps or fluorescent lamps or for solar thermal applications;
reflector glasses, in particular for lamps, and architectural glasses;
temperature-cycling resistant glasses, in particular for stove parts, refrigerator parts or hearth parts.

It will be understood that the afore-mentioned features and the features of the invention to be mentioned hereinafter cannot only be used in the respectively given combination, but also in different combinations or independently, without departing from the scope of the invention.

DESCRIPTION OF PREFERRED EMBODIMENTS

Examples

Table 1a and 1b glasses according to the invention are summarized together with their most important characteristics.

All these glasses have a good hydrolytic resistance and a working temperature T4 below 1350° C. A good chemical pre-stressing ability is documented by a high compressive stress (CS) after pre-stressing, going together with a favorable depth of length (DoL) in the range of 20 micrometers.

The glasses are molten using common raw materials within an inductively heated Pt/Rh crucible (Pt20Rh) at 1650° C. The melting time was three to four hours. Subsequently the melt was stirred for one hour for homogenizing at 1600° C., and thereafter was left at this temperature without stirring for two hours to allow possibly obtained bubbles to rise to the surface. The melt was cooled with a defined cooling rate of 30 K/h.

Subsequently, the glasses were chemically pre-stressed. During the process of chemical pre-stressing a surface compressive stress (compressive stress CS) results. The resulting compressive stress zone or depth of length (DoL) during chemical pre-stressing typically is between 10 and 50 µm. The depth depends on the glass and the process that are used.

This stress is produced by the exchange of smaller ($Na^+$) ions with larger volume ions ($K^+$) within the surface layer. Usually herein due to low diffusion energies alkaline ions are exchanged. Thus the utilized glasses were pre-stressed within a potassium salt bath below the glass transition temperature (Tg). Any known potassium salts, the anions of which are stable within the given temperature range, can be used for the potassium salt bath. Preferably $KNO_3$ is used. The salt bath (usually beginning with 100% potassium salt) is then renewed when by the exchange of the potassium ion content has decreased so that the desired exchange depth cannot be reached anymore. This is usually the case at <95 wt.-% potassium salts.

The glass bodies were left in salt baths, preferably in baths consisting of 100 wt-% up to at least 95 wt.-% potassium salts, at bath temperatures between 400° C. and 550° C., preferably between 450° C. and 500° C., particularly preferred at a maximum of 500° C. for 2 to 10 h, particularly preferred for at least 5 h. After the ion exchange within the salt bath the containers were removed from the bath and cooled.

TABLE 1a

Examples (compositions given in mol-%)

| | Examples (mol-%) | | | | | | | |
|---|---|---|---|---|---|---|---|---|
| | 1 | 2 | 3 | 4 | 5 | 6 | 7 | 8 |
| $SiO_2$ | 65.9 | 70.2 | 68.8 | 72.5 | 68.2 | 68.0 | 68.2 | 64.0 |
| $B_2O_3$ | 0.0 | 0.0 | 0.0 | 0.0 | 0.0 | 0.0 | 0.0 | 0.0 |
| $Al_2O_3$ | 11.7 | 10.4 | 11.3 | 9.1 | 11.8 | 12.0 | 11.8 | 12.0 |
| $Na_2O$ | 6.1 | 9.0 | 10.0 | 8.5 | 10.5 | 12.0 | 10.5 | 4.0 |
| $K_2O$ | 0.0 | 0.5 | 0.0 | 0.0 | 0.0 | 0.5 | 0.0 | 0.0 |
| MgO | 10.1 | 8.0 | 7.0 | 7.0 | 3.2 | 0.0 | 1.2 | 12.0 |
| CaO | 6.2 | 2.0 | 3.0 | 3.0 | 5.2 | 5.0 | 5.2 | 8.0 |
| $ZrO_2$ | 0.0 | 0.0 | 0.0 | 0.0 | 1.1 | 0.0 | 0.0 | 0.0 |
| $TiO_2$ | 0.0 | 0.0 | 0.0 | 0.0 | 0.0 | 1.5 | 3.1 | 0.0 |
| F | 0.0 | 0.0 | 0.0 | 0.0 | 0.0 | 1.0 | 0.0 | 0.0 |
| $Al_2O_3$:$Na_2O$ | 1.92 | 1.15 | 1.13 | 1.07 | 1.12 | 1.00 | 1.12 | 3.00 |
| $Al_2O_3$:CaO | 1.9 | 5.2 | 3.8 | 3.0 | 2.3 | 2.4 | 2.3 | 1.5 |
| $SiO_2$ + $Al_2O_3$ | 77.6 | 80.6 | 80.0 | 81.5 | 80.0 | 80.0 | 80.0 | 76.0 |
| CTE [$10^{-5}$/K] | 5.36 | 6.27 | 6.44 | 5.88 | 6.68 | 7.62 | 6.89 | 4.93 |
| Tg [° C.] | 702 | 668 | 675 | 682 | 692 | 642 | 685 | 728 |
| Density [g/cm³] | 2.50 | 2.43 | 2.45 | 2.41 | 2.49 | 2.46 | 2.47 | 2.54 |
| T4 [° C.] | 1262 | 1336 | 1316 | 1344 | 1315 | 1300 | 1301 | 1238 |
| CS [MPa] | | 748 | 849 | 701 | 900 | 959 | 923 | |
| DoL [μm] | | 23 | 19 | 19 | 17 | 26 | 27 | |
| HGB DIN ISO 719 [μg/g] | 16.0 | | | | | | | |
| Water resistance DIN ISO 719 | HGB1 | | | | | | | |
| HGA DIN ISO 720 [μg/g] | | 49.1 | 49.9 | 47.0 | 46.6 | 61 | 50.8 | 47.0 |
| Water resistance DIN ISO 720 | | HGA1 | HGA1 | HGA1 | HGA1 | HGA1 | HGA1 | HGA1 |

TABLE 1b

Examples (compositions given in mol-%)

| | Example mol-% | | | | | | |
|---|---|---|---|---|---|---|---|
| | 9 | 10 | 11 | 12 | 13 | 14 | 15 |
| $SiO_2$ | 69.3 | 69.0 | 68.7 | 69.2 | 68.0 | 68.3 | 68.3 |
| $B_2O_3$ | 0.0 | 0.0 | 0.0 | 0.0 | 0.0 | 0.0 | 0.0 |
| $Al_2O_3$ | 11.9 | 11.9 | 11.7 | 11.6 | 11.5 | 11.3 | 11.3 |
| $Na_2O$ | 10.0 | 10.0 | 10.5 | 10.0 | 10.1 | 10.2 | 9.9 |
| $K_2O$ | 1.0 | 1.0 | 1.0 | 1.0 | 1.0 | 1.0 | 1.2 |
| MgO | 0.0 | 0.0 | 0.0 | 0.0 | 0.5 | 0.0 | 0.5 |
| CaO | 6.4 | 6.8 | 6.8 | 6.7 | 7.3 | 7.4 | 7.2 |
| $ZrO_2$ | 0.0 | 0.0 | 0.0 | 0.0 | 0.0 | 0.0 | 0.0 |
| $TiO_2$ | 0.8 | 0.8 | 0.8 | 0.8 | 1.1 | 1.1 | 1.1 |
| F | 0.6 | 0.6 | 0.6 | 0.6 | 0.0 | 0.0 | 0.0 |
| Cl | 0.0 | 0.0 | 0.0 | 0.0 | 0.6 | 0.6 | 0.6 |
| $Al_2O_3$:$Na_2O$ | 1.18 | 1.18 | 1.11 | 1.16 | 1.14 | 1.11 | 1.14 |
| $Al_2O_3$:CaO | 1.9 | 18 | 1.7 | 1.7 | 1.6 | 1.5 | 1.6 |
| $SiO_2$ + $Al_2O_3$ | 81.2 | 80.8 | 80.3 | 80.8 | 79.5 | 79.6 | 79.6 |
| CTE [$10^{-8}$/K] | 6.98 | 7.06 | 7.22 | 7.04 | 7.1 | 7.21 | 7.06 |
| Tg [° C.] | 694 | 685 | 685 | 689 | 677 | 679 | 675 |
| Density [g/cm³] | 2.4509 | 2.455 | 2.4568 | 2.4535 | 2.4668 | 2.4645 | 2.4632 |
| T4 [° C.] | 1358 | 1351 | 1330 | 1348 | 1308 | 1306 | 1313 |
| CS [MPa] | | | 862 | 858 | 840 | 889 | 886 |
| DoL [μm] | | | 35 | 33 | 34 | 35 | 35 |
| HGB DIN ISO 719 [μg/g] | | | | | | | |
| Water resistance DIN ISO 719 | | | | | | | |
| HGA DIN ISO 720 [μg/g] | 47.0608 | 50.2159 | 51.8 | 48.5 | 54.7 | 55.7 | 55.5 |
| Water resistance DIN ISO 720 | HGA1 | HGA1 | HGA1 | HGA1 | HGA1 | HGA1 | HGA1 |

Comparative examples not covered by the invention are given in Table 2.

TABLE 2

Comparative examples (compositions given in mol-%)

| | V1 | V2 | V3 | V4 | V5 | V6 | V7 | V8 |
|---|---|---|---|---|---|---|---|---|
| $SiO_2$ | 71.0 | 76.0 | 60.9 | 75.6 | 70.0 | 71.0 | 74.1 | 67.5 |
| $B_2O_3$ | 0.0 | 0.0 | 0.0 | 0.0 | 0.0 | 0.0 | 0.0 | 0.0 |
| $Al_2O_3$ | 11.0 | 7.0 | 16.5 | 6.0 | 6.0 | 5.0 | 10.5 | 8.7 |
| $Na_2O$ | 10.0 | 10.0 | 12.2 | 11.2 | 8.0 | 4.0 | 2.0 | 4.0 |
| $K_2O$ | 1.0 | 1.0 | 2.9 | 0.1 | 0.0 | 0.0 | 0.0 | 0.0 |
| MgO | 5.0 | 4.0 | 2.1 | 6.8 | 8.0 | 10.0 | 7.8 | 9.9 |
| CaO | 1.0 | 1.0 | 1.7 | 0.4 | 8.0 | 10.0 | 5.6 | 9.9 |
| $ZrO_2$ | 1.0 | 1.0 | 3.7 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| F | 0.0 | 0.0 | 0.0 | 0.0 | 0.0 | 0.0 | 0.0 | 0.0 |
| $Al_2O_3$:$Na_2O$ | 1.10 | 0.70 | 1.35 | 0.53 | 0.75 | 1.25 | 5.23 | 2.20 |
| $Al_2O_3$:CaO | 11.0 | 7.0 | 9.7 | 17.1 | 0.8 | 0.5 | 1.9 | 0.9 |
| $SiO_2$ + $Al_2O_3$ | 82.0 | 83.0 | 77.4 | 81.6 | 76.0 | 76.0 | 84.6 | 76.3 |
| CTE [$10^{-6}$/K] | 6.7 | 6.7 | 8.39 | 6.82 | 6.52 | 5.53 | 3.56 | 4.97 |
| Tg [° C.] | 714 | 649 | 648 | 618 | 653 | 703 | 767 | 712 |
| Density [g/cm$^3$] | 2.44 | 2.41 | 2.46 | 2.39 | 2.48 | 2.48 | 2.43 | 2.51 |
| T4 [° C.] | 1401 | 1373 | 1328 | 1305 | 1207 | 1237 | 1399 | 1250 |
| CS [MPa] | | 750 | 1110 | 702 | | | | |
| DoL [μm] | | 32 | 31 | 32 | | | | |
| HGB DIN ISO 719 [μg/g] | 16.7 | 18.3 | 28.0 | 44.0 | | | 9.0 | 26.0 |
| Water resistance DIN ISO 719 | HGB1 | HGB1 | HGB1 | HGB2 | | | HGB1 | HGB1 |
| HGA DIN ISO 720 [μg/g] | 20.1 | 50.4 | 71.9 | 83.6 | 78.0 | 92.0 | | 63.0 |
| Water resistance DIN ISO 720 | HGA1 | HGA1 | HGA2 | HGA2 | HGA2 | HGA2 | | HGA2 |

In the comparative examples V1 and V2 the total content of $SiO_2$+$Al_2O_3$ is too high so that the working temperature increases beyond the desired limit of 1350° C. In addition, at the comparative example V2 the ratio of $Al_2O_3$/$Na_2O$ is smaller than 1.

In the comparative example V7 also the total content of $SiO_2$+$Al_2O_3$ is too high, so that the working temperature increases beyond the desired limit of 1350° C.

The comparative examples V5, V6 and V8, due to the too small ratio of $Al_2O_3$/CaO which is smaller than 1, show a bad hydrolytic resistance.

The comparative example V4 has a too low ratio of $Al_2O_3$/$Na_2O$ which is smaller than 1. Also this leads to a bad hydrolytic resistance.

In the comparative example V3 the content of $Al_2O_3$ and $ZrO_2$ is too high which leads to a decrease in hydrolytic resistance.

What is claimed is:

1. A glass comprising at least the following components (given in mol-% on oxide basis):

| | |
|---|---|
| $SiO_2$ | 64-77 |
| $Al_2O_3$ | 5-14 |
| $Na_2O$ | 4-12 |
| CaO | 1-12 |
| MgO | 0-14 |
| $ZrO_2$ | 0-2 |
| $TiO_2$ | 0-4.5; | wherein the ratio $Al_2O_3$/$Na_2O$≥1 and ≤3;
wherein the ratio $Al_2O_3$/CaO≥1.5 and ≤5.2;
wherein the total content $SiO_2$+$Al_2O_3$<82 mol-%;
wherein the content of $K_2O$ is >0.5 mol-%; and
wherein the glass has a working temperature of less than 1350° C.

2. The glass of claim 1, which does not contain $B_2O_3$, apart from unavoidable contaminations.

3. The glass of claim 1, wherein the content of $K_2O$ is a maximum of 3 mol-%.

4. The glass of claim 1, further comprising up to 3.5 mol-% SrO.

5. The glass of claim 1, further comprising at least 0.1 mol-% of SrO.

6. The glass of any of the preceding claims, wherein the total content $SiO_2$+$Al_2O_3$+$ZrO_2$<82 mol-%.

7. The glass of claim 1, wherein the $Al_2O_3$ content is at least 9 mol-%.

8. The glass of claim 1, comprising up to 3 mol-% of $Li_2O$.

9. The glass of claim 1, which does not contain ZnO, apart from unavoidable impurities.

10. The glass of claim 1, wherein the content of magnesium oxide is a maximum of 4 mol-%.

11. The glass of claim 1, wherein the hydrolytic resistance according to DIN ISO 719 is HGB 1.

12. The glass of claim 1, wherein the hydrolytic resistance according to DIN ISO 720 is HGA1.

13. The glass of claim 1, further comprising at least 0.1 mol-% of $ZrO_2$.

14. The glass of claim 1, further comprising at least 0.1 mol-% of $TiO_2$.

15. The glass of claim 1, further comprising 0.5 mol-% to 1.5 mol-% of $TiO_2$.

16. The glass of claim 1, wherein the total content of $ZrO_2$+$TiO_2$ is at least 0.1 mol-%.

17. The glass of claim 1, wherein the total content of $ZrO_2$+$TiO_2$ is a maximum of 4.5 mol-%.

18. A glass container made of a glass according to claim 1, being chemically pre-stressed by means of ion-exchange, comprising a compressive stress layer with a layer depth of at least 10 μm and a compressive stress of at least 500 MPa.

19. A glass comprising at least the following components (given in mol-% on oxide basis):

| | |
|---|---|
| $SiO_2$ | 64-77 |
| $Al_2O_3$ | 5-14 |
| $Na_2O$ | 4-12 |
| CaO | 1-12 |
| MgO | 0-14 |
| $ZrO_2$ | 0-2 |
| $TiO_2$ | 0-4.5; | wherein the ratio $Al_2O_3/Na_2O \geq 1$ and $\leq 3$;
wherein the ratio $Al_2O_3/CaO \geq 1.5$ and $\leq 5.2$;
wherein the total content $SiO_2+Al_2O_3 < 82$ mol-%; and
wherein the glass has a hydrolytic resistance according to DIN ISO 719 that is HGB 1 and/or according to DIN ISO 720 that is HGA1.

* * * * *